United States Patent
Araki et al.

(10) Patent No.: US 10,620,090 B2
(45) Date of Patent: Apr. 14, 2020

(54) ROTATING MACHINE ABNORMALITY DETECTION DEVICE, ROTATING MACHINE ABNORMALITY DETECTION METHOD, AND ROTATING MACHINE

(71) Applicant: Kobe Steel, Ltd., Hyogo (JP)

(72) Inventors: Kaname Araki, Kobe (JP); Eiji Takahashi, Kobe (JP); Shugo Takaki, Takasago (JP); Masato Hayashi, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 237 days.

(21) Appl. No.: 15/769,456

(22) PCT Filed: Sep. 1, 2016

(86) PCT No.: PCT/JP2016/075590
§ 371 (c)(1),
(2) Date: Apr. 19, 2018

(87) PCT Pub. No.: WO2017/073160
PCT Pub. Date: May 4, 2017

(65) Prior Publication Data
US 2018/0306671 A1 Oct. 25, 2018

(30) Foreign Application Priority Data
Oct. 28, 2015 (JP) ................. 2015-211558

(51) Int. Cl.
*G01M 13/028* (2019.01)
*G01N 29/14* (2006.01)
(Continued)

(52) U.S. Cl.
CPC .......... *G01M 13/028* (2013.01); *G01H 1/006* (2013.01); *G01M 13/00* (2013.01);
(Continued)

(58) Field of Classification Search
CPC .... G01M 13/028; G01M 13/00; G01H 1/006; G01H 1/08; G01N 29/14; G01N 29/4427; G01N 29/48
(Continued)

(56) References Cited

U.S. PATENT DOCUMENTS

2017/0205276 A1* 7/2017 Araki ................... G01H 17/00
2017/0219420 A1* 8/2017 Takahashi ............. G01H 17/00

FOREIGN PATENT DOCUMENTS

| JP | H05-231361 A | 9/1993 |
| JP | H09-133577 A | 5/1997 |

* cited by examiner

*Primary Examiner* — Tarun Sinha
(74) *Attorney, Agent, or Firm* — Studebaker & Brackett PC

(57) ABSTRACT

A first determination unit performs a process (first process) of sequentially dividing an intensity value constituting first data by a reference intensity value to calculate an intensity ratio and determining whether the intensity ratio exceeds a first threshold (steps S3 and S4). When a predetermined period has elapsed, a second determination unit calculates an average change rate of the first data in the predetermined period to determine whether the average change rate is within a predetermined range (steps S9 and S10). When it is determined that the average change rate is within the range, the reference intensity value is updated and lowered (step S11). When the reference intensity value is updated, the first determination unit performs the first process by using the updated reference intensity value in the next predetermined period.

7 Claims, 11 Drawing Sheets

(51) Int. Cl.
  *G01N 29/48* (2006.01)
  *G01M 13/00* (2019.01)
  *G01H 1/00* (2006.01)
  *G01N 29/44* (2006.01)
  *G01H 1/08* (2006.01)

(52) U.S. Cl.
  CPC ......... *G01N 29/14* (2013.01); *G01N 29/4427* (2013.01); *G01N 29/48* (2013.01); *G01H 1/08* (2013.01)

(58) Field of Classification Search
  USPC .......................................................... 73/646
  See application file for complete search history.

ROTATING MACHINE ABNORMALITY DETECTION DEVICE, ROTATING MACHINE ABNORMALITY DETECTION METHOD, AND ROTATING MACHINE

TECHNICAL FIELD

The present invention relates to a technique for detecting an abnormality of a rotating body included in a rotating machine.

BACKGROUND ART

Various techniques for detecting an abnormality of a rotating machine (e.g., compressor, motor, generator) have been proposed. For example, a compressor diagnostic method for detecting an AE wave generated by contact between a male rotor and a female rotor during rotation of a rotor of a non-contact type compressor and a rotation signal of the rotor at that time, and for diagnosing rotor contact based on the detected AE signal and rotation signal has been proposed. The compressor diagnostic method includes amplifying and detecting the AE signal, performing a frequency analysis and an averaging process on the output, and comparing the result with determination criteria based on the rotation signal to diagnose the presence of rotor contact (e.g., refer to Patent Literature 1).

In addition, an abnormal contact detection method for detecting an abnormal contact state of a rotating machine in which a first rotor and a second rotor rotate in a pair has been proposed. The abnormal contact detection method includes: detecting an elastic wave signal emitted from the rotating machine; identifying contact between the rotors when the detected elastic wave signal includes a predetermined level or more of at least one of a rotational frequency component of the first rotor and a rotational frequency component of the second rotor; identifying contact between the rotor and a casing when the detected signal includes a predetermined level or more of a frequency component obtained by multiplying the number of blades of the first rotor by a rotation frequency of the rotor and a frequency component obtained by multiplying the number of blades of the second rotor by the rotation frequency of the rotor; and identifying contact between a sealant and the rotor when a waveform level of the elastic wave signal emitted from the rotating machine is larger than a predetermined level but the contact between the rotors and the contact between the rotor and the casing are not identified (e.g., refer to Patent Literature 2).

A main cause of a rotating machine abnormality is contact between rotating bodies or contact between a rotating body and a casing. While the rotating machine is in operation, an elastic wave is continuously generated from the rotating machine. When the contact occurs, a relatively large elastic wave occurs instantaneously. Using this principle, a rotating machine abnormality is detected. The elastic wave is detected using a vibration sensor or an ultrasonic sensor. Such a sensor uses a piezoelectric element, and when a temperature rises at a place where the sensor is disposed, sensitivity of the sensor decreases. Therefore, it is necessary to perform temperature compensation for the temperature rise.

CITATION LIST

Patent Literature

Patent Literature 1: Japanese Patent Application Laid-Open No. H05-231361

Patent Literature 2: Japanese Patent Application Laid-Open No. H09-133577

SUMMARY OF INVENTION

An object of the present invention is to provide a rotating machine abnormality detection device, a rotating machine abnormality detection method, and a rotating machine capable of performing temperature compensation for a decrease in sensitivity of a sensor caused by a rise in a temperature at a place where the sensor that detects an elastic wave is disposed.

A rotating machine abnormality detection device according to a first aspect of the present invention is a device for detecting an abnormality of a rotating machine including a rotating body by using a sensor that detects an elastic wave generated from the rotating machine. The rotating machine abnormality detection device includes: an acquisition unit configured to acquire data generated by using a signal output from the sensor, the data being obtained by arranging an intensity value indicating intensity of the elastic wave on a time-series basis; a first determination unit configured to determine that the rotating machine is abnormal when an intensity ratio exceeds a first threshold as a result of a first process, the first process being defined as a process of sequentially dividing the intensity value contained in the data by a predetermined reference intensity value to calculate the intensity ratio, and sequentially comparing the intensity ratio with the predetermined first threshold to determine whether the intensity ratio exceeds the first threshold; a second determination unit configured to perform a second process every time a predetermined period elapses, the second process being defined as a process of, when the predetermined period has elapsed, calculating an average change rate of the data in the predetermined period to determine whether the average change rate is within a predetermined range; and an update unit configured to update and lower the reference intensity value when it is determined as a result of the second process that the average change rate is within the range. When the reference intensity value is updated, the first determination unit performs the first process by using the updated reference intensity value in the next predetermined period.

The above and other objects, features, and advantages of the present invention will be apparent from the following detailed description and the accompanying drawings.

DESCRIPTION OF EMBODIMENTS

When an abnormality occurs in a rotating machine, an intensity value indicating intensity of an elastic wave generated using a signal output from a sensor rises instantaneously. When a temperature at a place where the sensor is disposed rises, sensitivity of the sensor decreases and the intensity value decreases. When the intensity value decreases, an amount of instantaneous rise in the intensity value decreases due to occurrence of the abnormality in the rotating machine. Therefore, a method of comparing the intensity value with a threshold and determining that the rotating machine is abnormal when the intensity value exceeds the threshold may not be able to detect the rotating machine abnormality. Since the sensitivity of the sensor decreases not only for a desired signal component but also for components such as vibration components that become noise, a signal-to-noise (SN) ratio of the signal output from the sensor does not change much within a certain temperature range. The inventors of the present invention have focused on the above points to provide one embodiment of the present invention and a modification thereof.

Figure 1:
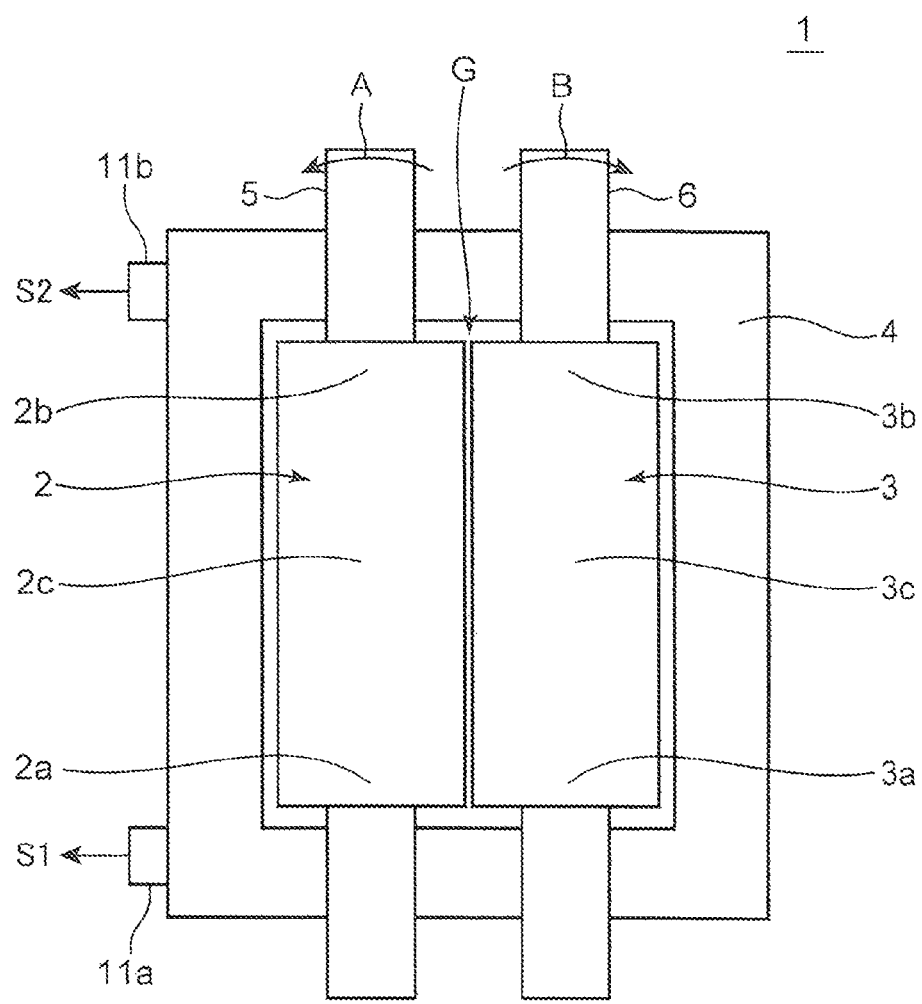
FIG. 1 is a schematic view illustrating one example of a rotating machine.

An embodiment of the present invention will be described in detail below with reference to the drawings. FIG. 1 is a schematic diagram illustrating one example of a rotating machine 1. The rotating machine 1 includes a first rotating body 2, a second rotating body 3 disposed with a predetermined gap G between the first rotating body 2 and the second rotating body 3, and a casing 4 in which the first rotating body 2 and the second rotating body 3 are accommodated.

The first rotating body 2 includes a rotating shaft 5 and is driven to rotate around the rotating shaft 5 in an arrow A direction (e.g., counterclockwise). The second rotating body 3 includes a rotating shaft 6 and is driven to rotate around the rotating shaft 6 in an arrow B direction opposite to the arrow A direction (e.g., clockwise).

Two sensors 11a and 11b are attached to an outer wall of the casing 4. The sensors 11a and 11b detect an elastic wave generated from the rotating machine 1 and output signals S1 and S2 indicating a relationship between intensity of the elastic wave and time, respectively. The elastic wave means, for example, a vibration wave or an ultrasonic wave.

The sensor 11a is positioned on a side of one end 2a of the first rotating body 2. The sensor 11b is positioned on a side of the other end 2b of the first rotating body 2. In this manner, the sensors 11a and 11b are disposed at a plurality of predetermined different places of the rotating machine 1 including the rotating bodies, and detect the elastic wave generated from the rotating machine 1 while the rotating bodies are rotating. One sensor may not be able to detect an abnormality if the place where the abnormality occurs is away from the sensor. For this reason, the two sensors 11a and 11b are disposed at predetermined different places of the rotating machine 1 separated from each other. Note that the attachment places of the sensors 11a and 11b are not limited to the places described above. In addition, in the present embodiment, a description will be made by taking the two sensors 11a and 11b as an example of the plurality of sensors, but the number of sensors is required at least to be two or more.

Figure 2:
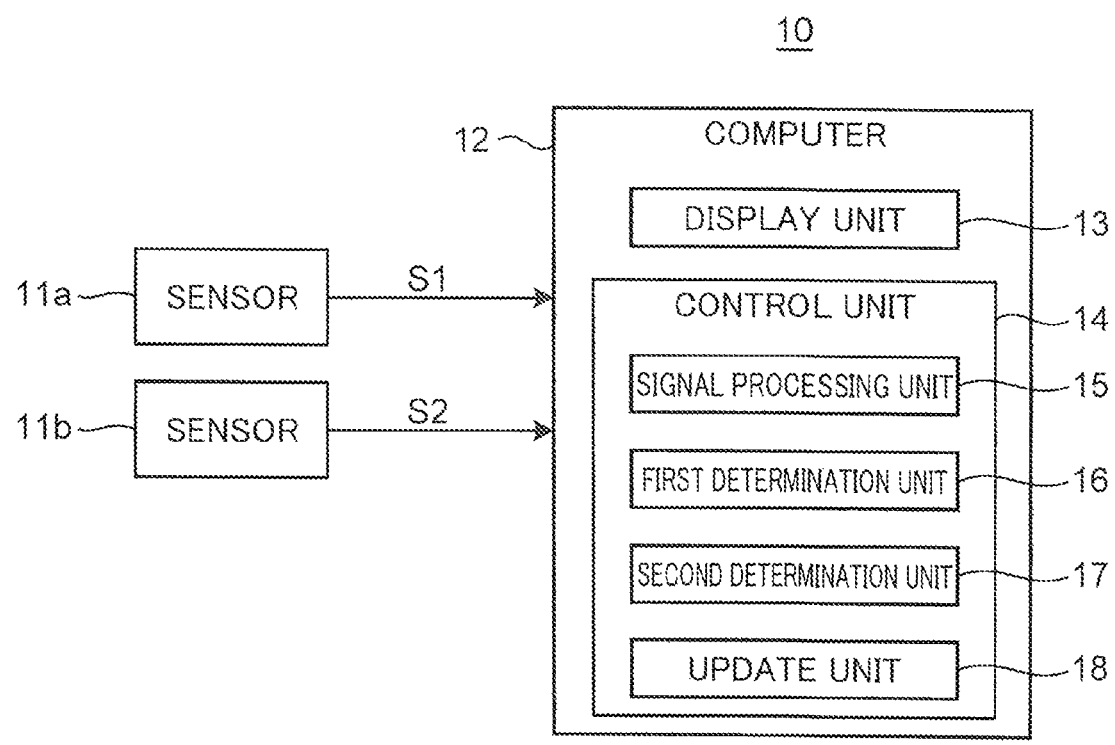
FIG. 2 is a block diagram illustrating a configuration of a rotating machine abnormality detection device according to the present embodiment.

FIG. 2 is a block diagram illustrating a configuration of a rotating machine abnormality detection device 10 according to the present embodiment. The rotating machine abnormality detection device 10 includes the sensors 11a and 11b and a computer 12.

The sensors 11a and 11b are required at least to detect the elastic wave generated by the first rotating body 2 or the second rotating body 3 coming into contact with something during rotation. To detect an ultrasonic wave generated by the contact as the elastic wave, an acoustic emission (AE) sensor is used. To detect a vibration generated by the contact as the elastic wave, a vibration sensor is used. In the present embodiment, a description will be made by taking the AE sensor as an example of the sensors 11a and 11b.

The computer 12 includes a display unit 13 and a control unit 14. The display unit 13 is a display such as a liquid crystal panel. The control unit 14 is implemented by a central processing unit (CPU), a random access memory (RAM), a read only memory (ROM), and the like. Various programs and software for executing abnormality detection of the rotating machine 1 are stored in the ROM.

The control unit 14 includes, as functional blocks, a signal processing unit 15, a first determination unit 16, a second determination unit 17, and an update unit 18.

The signal processing unit 15 calculates a root mean square value (calculates an RMS value) of the analog signal S1 output from the sensor 11a, performs analog/digital (A/D) conversion on the RMS value, and then generates first data, which is digital data. The signal processing unit 15 also performs a similar process on the analog signal S2 output from the sensor 11b, and then generates second data, which is digital data. These data are specific examples of data in which intensity values, which are values indicating intensity of the elastic wave, are arranged on a time-series basis. The signal processing unit 15 functions as an acquisition unit. The acquisition unit acquires the data generated by using the signals output from the sensors, the data being obtained by arranging the intensity values indicating the intensity of the elastic wave on a time-series basis.

Figure 3:
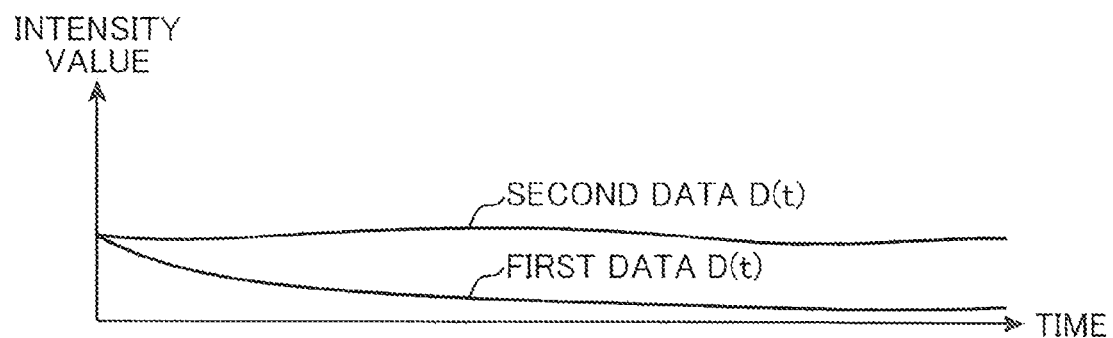
FIG. 3 is a graph illustrating first data D(t) and second data D(t) generated by a signal processing unit when the rotating machine is in a normal condition.

FIG. 3 is a graph illustrating the first data D(t) and the second data D(t) generated by the signal processing unit 15 when the rotating machine 1 is in a normal condition. A vertical axis of the graph represents the intensity values, and a horizontal axis represents time.

When the rotating machine 1 is in a normal condition, the second data D(t) is almost constant, whereas the first data D(t) gradually decreases and then becomes almost constant. A cause of the latter is that, with reference to FIG. 1, the sensor 11a that outputs the signal S1, on which the first data D(t) is based, is disposed at a place where the temperature rises during an operation of the rotating machine 1.

A detailed description will be made assuming that the rotating machine 1 is a compressor. During the operation of the rotating machine 1, a gas is sucked from a suction port (not illustrated) of the rotating machine 1 into the rotating machine 1, and the gas is compressed by the rotating machine 1 and discharged from a discharge port of the rotating machine 1. Since the compressed gas has a high temperature, at the discharge port through which the compressed gas passes, the temperature gradually rises after the rotating machine 1 starts the operation, and becomes saturated at a certain time and becomes constant. The sensors 11a and 11b use piezoelectric elements, and when the temperatures at the places where the sensors 11a and 11b are disposed rise, the sensitivity of the sensors 11a and 11b decreases. The sensor 11a is disposed at the discharge port of the rotating machine 1. Therefore, even when the rotating machine 1 is in a normal condition, the intensity value indicated by the first data D(t) generated using the signal S1 output from the sensor 11a gradually decreases and then becomes almost constant.

The sensor 11b that outputs the signal S2, on which the second data D(t) is based, is disposed at the suction port of the rotating machine 1. During the operation of the rotating machine 1, the temperature does not rise at the suction port, and thus the second data D(t) is almost constant.

Figure 4:
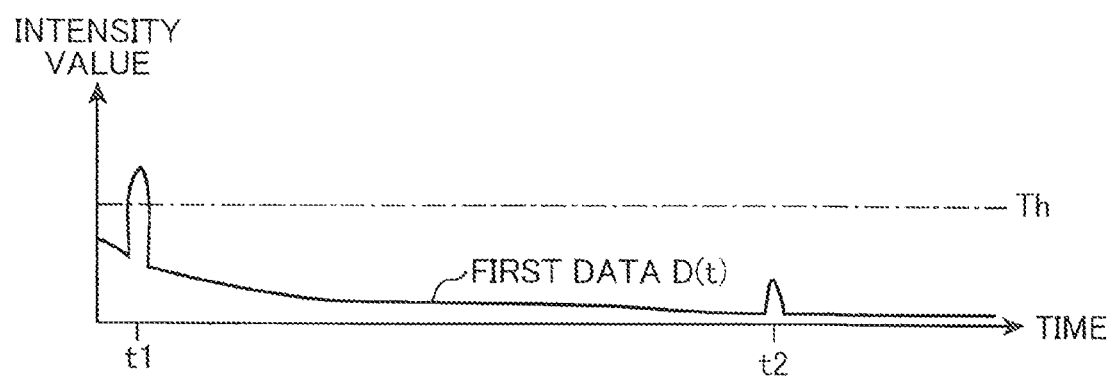
FIG. 4 is a graph illustrating a relationship between the first data D(t) and a threshold Th.

Both of the intensity values of the first data D(t) and the second data D(t) rise instantaneously when an abnormality occurs in the rotating machine 1. However, for the first data D(t), as time elapses, the intensity value when the rotating machine 1 is in a normal condition decreases, and accordingly, the intensity value when an abnormality occurs in the rotating machine 1 decreases. This is illustrated in FIG. 4. FIG. 4 is a graph illustrating a relationship between the first data D(t) and a threshold Th. A vertical axis of the graph is the same as the vertical axis of the graph of FIG. 3, and a horizontal axis of the graph is the same as the horizontal axis of the graph of FIG. 3.

In a case where much time has not elapsed since the rotating machine 1 starts the operation (e.g., at a time t1), the intensity value changes significantly if an abnormality occurs in the rotating machine 1. Since the intensity value therefore exceeds the threshold Th, the abnormality of the rotating machine 1 is detected. However, in a case where a certain time has elapsed since the operation starts (e.g., at a time t2), the intensity value shows a small change even if an abnormality occurs in the rotating machine 1. Therefore, the intensity value does not exceed the threshold Th, and thus the abnormality of the rotating machine 1 is not detected.

Figure 5:
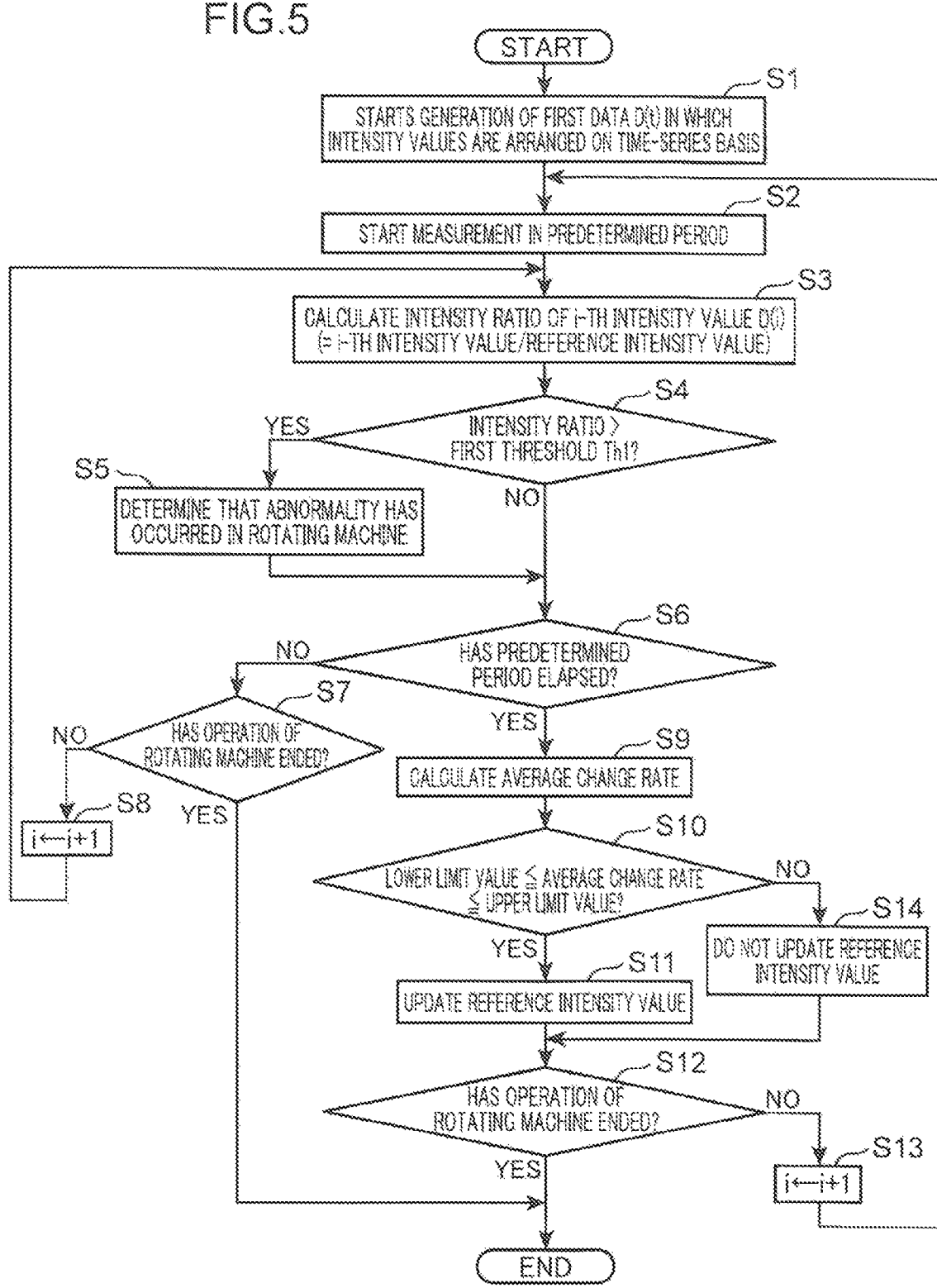
FIG. 5 is a flowchart describing an operation of the rotating machine abnormality detection device according to the present embodiment.

Thus, the present embodiment includes the first determination unit 16, the second determination unit 17, and the update unit 18 illustrated in FIG. 2. These units are described in detail in an operation of the rotating machine abnormality detection device 10 according to the present embodiment. FIG. 5 is a flowchart describing the operation of the rotating machine abnormality detection device 10 according to the present embodiment. A description will be made by taking the first data D(t) as an example.

With reference to FIGS. 2 and 5, when the operation of the rotating machine 1 starts, the sensor 11a generates the signal S1 and sends the generated signal S1 to the computer 12. Based on the signal S1, the signal processing unit 15 starts generation of the first data D(t) (step S1). The first data D(t) has a structure in which the intensity values indicating the intensity of the elastic wave are arranged on a time-series basis. The first intensity value is D(1), the second intensity value is D(2), . . . , and the n-th intensity value is D(n). "t" is a time in a range from 1 to n.

The first determination unit 16 starts measurement in a predetermined period (step S2). As will be described below, when the rotating machine 1 is in a normal condition, the first determination unit 16 normalizes the first data D(t) illustrated in FIG. 3 such that an intensity ratio becomes almost 1 (FIG. 7), and then determines whether an abnormality has occurred in the rotating machine 1. The predetermined period has a desired length in which the intensity ratio is almost 1 when the rotating machine 1 is in a normal condition.

The first determination unit 16 calculates the intensity ratio by dividing the i-th intensity value D(i) on a time-series basis contained in the first data D(t) by a reference intensity value (step S3). Here, the first intensity value D(1) is divided by the reference intensity value. The first determination unit 16 stores an initial value of the reference intensity value in advance. The initial value is an intensity value obtained by using the signal S1 output from the sensor 11a when the rotating machine 1 starts the operation.

The first determination unit 16 compares the intensity ratio calculated in step 3 with the first threshold Th1 and determines whether the intensity ratio exceeds the first threshold Th1 (step S4). The first determination unit 16 stores the first threshold Th1 in advance. The first threshold Th1 is determined to satisfy a relationship of the intensity ratio <the first threshold Th1 when the rotating machine 1 is in a normal condition. Magnitude of the first threshold Th1 is fixed.

When the first determination unit 16 determines that the intensity ratio exceeds the first threshold Th1 (Yes in step S4), the first determination unit 16 determines that an abnormality has occurred in the rotating machine 1 (step S5). The first determination unit 16 records that an abnormality has occurred in the rotating machine 1.

After step S5, or when the first determination unit 16 determines that the intensity ratio is equal to or less than the first threshold Th1 (No in step S4), the first determination unit 16 determines whether the predetermined period in which the measurement has started in step S2 has elapsed (step S6).

When the first determination unit 16 determines that the predetermined period has not elapsed (No in step S6), the control unit 14 determines whether the operation of the rotating machine 1 has ended (step S7). When the control unit 14 determines that the operation of the rotating machine 1 has ended (Yes in step S7), the rotating machine abnormality detection device 10 ends the operation.

When the control unit 14 determines that the operation of the rotating machine 1 has not ended (No in step S7), the control unit 14 changes the order of the intensity value to the next order (step S8). Then, the control unit 14 returns to step S3, and the first determination unit 16 calculates the intensity ratio by dividing the next intensity value (here, the second intensity value D(2)) by the reference intensity value.

As described above, the first determination unit 16 performs a process (first process) of sequentially calculating the intensity ratio by dividing the intensity value contained in the first data D(t) by the predetermined reference intensity value, sequentially comparing the intensity ratio with the predetermined first threshold Th1, and determining whether the intensity ratio exceeds the first threshold (steps S3 and S4). When the intensity ratio exceeds the first threshold as a result of the first process (Yes in step S4), the first determination unit 16 determines that the rotating machine 1 is abnormal (step S5).

A case where the first determination unit 16 determines that the predetermined period has elapsed will be described (Yes in step S6). In this case, the second determination unit 17 calculates an average change rate (step S9). The average change rate is represented by the following formula.

Average change rate=|VF−VL|/T

Figure 6:
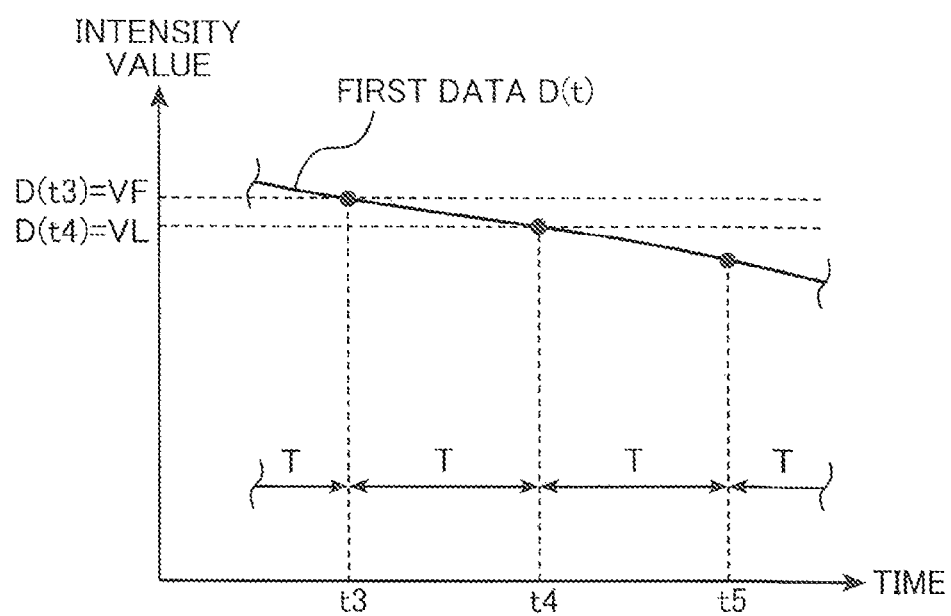
FIG. 6 is a graph illustrating a relationship among the first data D(t), a predetermined period T, a first intensity value VF in the predetermined period, and a last intensity value VL in the predetermined period.

T represents the predetermined period described in steps S2 and S6, VF represents the first intensity value in the predetermined period, and VL represents the last intensity value in the predetermined period. FIG. 6 is a graph illus-trating a relationship among the first data D(t), the predetermined period T, the first intensity value VF in the predetermined period, and the last intensity value VL in the predetermined period. For example, when the predetermined period T starts at a time t3 and ends at a time t4, the intensity value D(t3) is the first intensity value VF in the predetermined period, and the intensity value D(t4) is the last intensity value VL in the predetermined period. Each predetermined period T has the same length.

The average change rate is a value obtained by dividing, by the predetermined period T, an absolute value of a value obtained by subtracting the last intensity value VL in the predetermined period from the first intensity value VF in the predetermined period. At the place where the sensor 11a illustrated in FIG. 1 is disposed, the temperature rises gradually by the operation start of the rotating machine 1. For this reason, the intensity value constituting the first data D(t) shows a tendency to gradually decrease. However, due to some reasons, the temperature at the place where the sensor 11a is disposed may slightly drop in a certain predetermined period, resulting in a slight rise in the intensity value. In this case, the value obtained by subtracting the last intensity value VL in the predetermined period from the first intensity value VF in the predetermined period is negative. As will be described below, it is determined whether the average change rate is within a range between a lower limit value and an upper limit value, and accordingly, if the average change rate has a negative value, the determination cannot be made. Therefore, an absolute value is used.

The second determination unit 17 determines whether the average change rate calculated in step S9 is within the range between the lower limit value and the upper limit value (within a predetermined range) (step S10). In this range, no abnormality has occurred in the rotating machine 1, but since the temperature at the place where the sensor 11a is disposed rises, the sensitivity of the sensor 11a gradually decreases, resulting in a gradual decrease in the intensity of the elastic wave. The average change rate being within the range between the lower limit value and the upper limit value means that the rotating machine 1 is in a normal condition.

In this manner, when the predetermined period has elapsed (Yes in step S6), the second determination unit 17 calculates the average change rate of the first data D(t) in the predetermined period (step S9), and then determines whether the average change rate is within the predetermined range (step S10). This series of processes is referred to as a second process. The second determination unit 17 performs the second process every time the predetermined period elapses.

When the second determination unit 17 determines that the average change rate is within the range between the lower limit value and the upper limit value (Yes in step S10), the update unit 18 updates and lowers the reference intensity value (step S11). In the present embodiment, the last intensity value in the predetermined period is provided as the reference intensity value. For example, with reference to FIG. 6, in the predetermined period T (the period from the time t3 to the time t4), the intensity value D(t3) is the reference intensity value. The update unit 18 updates the reference intensity value to make the last intensity value D(t4) in the predetermined period T the reference intensity value. Accordingly, in the next predetermined period T (the period from the time t4 to the time t5), the intensity value D(t4) becomes the reference intensity value.

After step S11, the control unit 14 determines whether the operation of the rotating machine 1 has ended (step S12). When the control unit 14 determines that the operation of the rotating machine 1 has ended (Yes in step S12), the rotating machine abnormality detection device 10 ends the operation. When the control unit 14 determines that the operation of the rotating machine 1 has not ended (No in step S12), as in step S8, the control unit 14 changes the order of the intensity value to the next order (step S13). Then, the control unit 14 returns to step S2.

Figure 7:
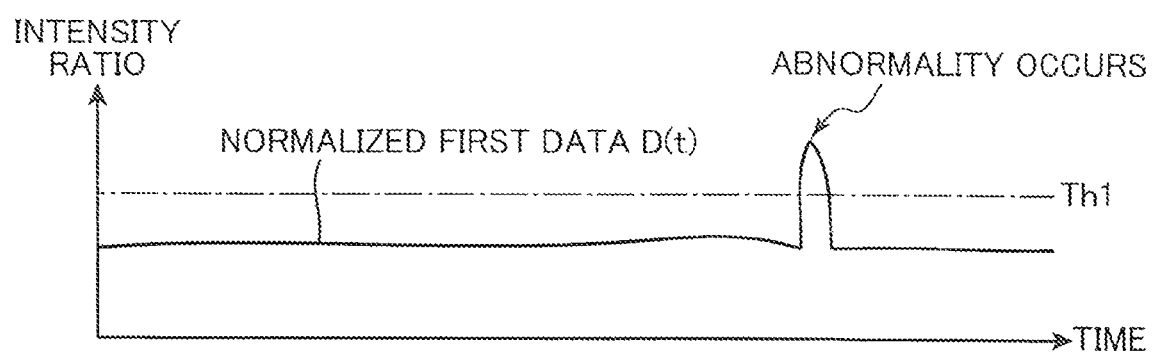
FIG. 7 is a graph illustrating a relationship between an intensity ratio and time.

With reference to FIG. 6, in the next predetermined period T (the period from the time t4 to the time t5), the first determination unit 16 uses the intensity value D(t4) as the reference intensity value and performs the process of steps S3 and S4. In this manner, the first determination unit 16 lowers the reference intensity value and calculates the intensity ratio every time the predetermined period T elapses. That is, the first determination unit 16 normalizes the first data D(t). FIG. 7 is a graph illustrating a relationship between the intensity ratio and time. A vertical axis of the graph represents the intensity ratio, and a horizontal axis of the graph represents time. The first determination unit 16 normalizes the first data D(t) and compares it with the first threshold Th1.

When the second determination unit 17 determines that the average change rate is out of the range between the lower limit value and the upper limit value (No in step S10), the update unit 18 does not update the reference intensity value (step S14). In a case where it is determined that the average change rate is out of the range described above (that is, when it is determined that the average change rate is not within the range described above), if the update unit 18 updates the reference intensity value and lowers the reference intensity value, the first determination unit 16 may not be able to correctly determine whether an abnormality has occurred in the rotating machine 1. Therefore, the reference intensity value is not updated. A detailed description will be made below.

Figure 8:
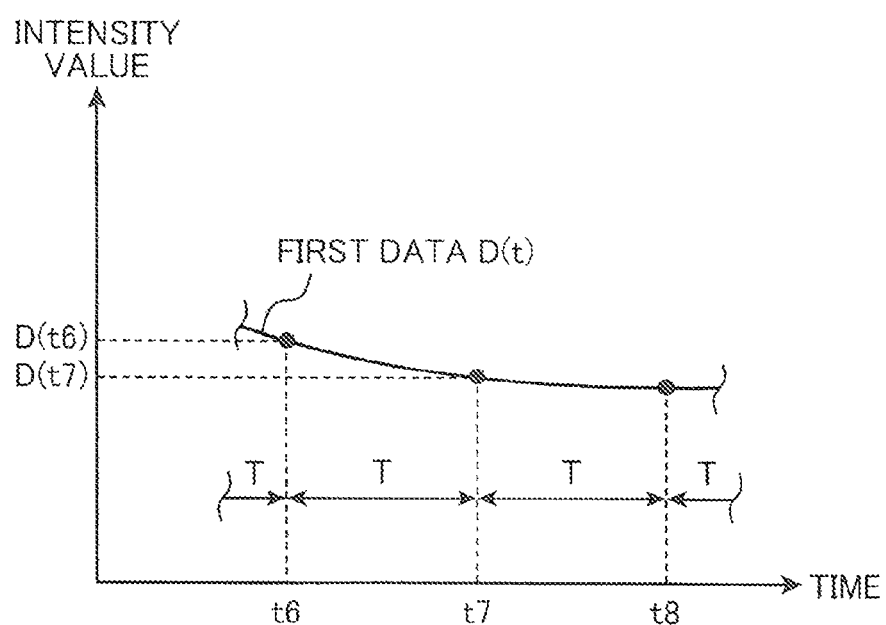
FIG. 8 is a graph illustrating the first data D(t) when an average change rate is close to zero.

A case where the average change rate is smaller than the lower limit value is a case where the average change rate is close to zero. FIG. 8 is a graph illustrating the first data D(t) when the average change rate is close to zero. A vertical axis of the graph represents the intensity value, and a horizontal axis of the graph represents time. In the predetermined period T from a time t6 to a time t7, the average change rate ((D(t6)−D(t7)/T) is close to zero. When the temperature at the place where the sensor 11a is disposed is stable or a vibration generated from the rotating machine 1 is stable, the average change rate is close to zero. In a case where the average change rate is close to zero and the reference intensity value is updated to be decreased from D(t6) to D(t7), in the next predetermined period T (the period from the time t7 to the time t8), the intensity ratio illustrated in FIG. 7 exceeds the first threshold Th1 when the intensity value rises even slightly.

Specifically, it is assumed that the intensity value D(t6) is 1.2 at the time t6, the intensity value D(t7) is 1.0 at the time t7, and the intensity value D(t8) is 0.9 at the time t8. It is assumed that the first threshold Th1 is 1.1. In the next predetermined period T (the period from the time t7 to the time t8), when the reference intensity value is 1.0 (when the reference intensity value is updated), the intensity ratio is larger than in a case where the reference intensity value is 1.2 (when the reference intensity value is not updated), and the intensity ratio becomes closer to the first threshold Th1. For example, the intensity ratio at the time t8 is 0.9 when the reference intensity value is 1.0, and is 0.75 when the reference intensity value is 1.2. Accordingly, in a case where the reference intensity value is 1.0, when the intensity value rises even slightly, the intensity ratio exceeds the first threshold Th1.

Therefore, when the average change rate is smaller than the lower limit value, the reference intensity value is not updated, and the reference intensity value indicated by D(t6) is continuously used in the next predetermined period T.

In a case where the average change rate is larger than the upper limit value, even when the intensity ratio is equal to or less than the first threshold Th1 (No in step S4), there is a possibility that an abnormality has occurred in the rotating machine 1. Therefore, in the case where the average change rate is larger than the upper limit value, the reference intensity value is not updated.

After step S14, the control unit 14 performs the process of step S12.

Main effects of the present embodiment will be described. With reference to FIGS. 2 and 5, the first determination unit 16 does not sequentially compare the intensity values with the first threshold Th1, but the first determination unit 16 performs the first process, that is, the process of sequentially calculating the intensity ratio by dividing the intensity values contained in the first data D(t) by the reference intensity value, sequentially comparing the intensity ratio with the first threshold, and determining whether the intensity ratio exceeds the first threshold (steps S3 and S4). When the intensity ratio exceeds the first threshold as a result of the first process (Yes in step S4), the first determination unit 16 determines that the rotating machine 1 is abnormal (step S5).

Meanwhile, when the predetermined period has elapsed (Yes in step S6), the second determination unit 17 performs the second process, that is, the process of calculating the average change rate of the data in the predetermined period and determining whether the average change rate is within the predetermined range (steps S9 and S10). The predetermined range is a range in which no abnormality has occurred in the rotating machine 1 but the temperature at the place where the sensor 11a is disposed rises and the sensitivity of the sensor 11a gradually decreases, resulting in a gradual decrease in the intensity of the elastic wave. The average change rate being within the predetermined range means that the rotating machine 1 is in a normal condition. When it is determined that the average change rate is within the predetermined range (Yes in step S10), the update unit 18 updates and lowers the reference intensity value (step S11). When the reference intensity value is updated, the first determination unit 16 performs the first process using the updated reference intensity value in the next predetermined period (steps S3, S4, and S5).

In this manner, according to the present embodiment, when there is no abnormality in the rotating machine 1 but the temperature rises gradually at the place where the sensor 11a is disposed and the intensity value gradually decreases, the reference intensity value is updated and lowered, and the intensity ratio is calculated using this updated reference intensity value. That is, in the present embodiment, the first data D(t) illustrated in FIG. 3 is not used as it is for comparison with the threshold. Instead, as illustrated in FIG. 7, the first data D(t) is normalized and compared with the threshold (first threshold Th1). Therefore, even if the intensity value gradually decreases because the temperature at the place where the sensor 11a is disposed rises gradually, it is possible to detect a rise in the intensity value caused by occurrence of an abnormality in the rotating machine 1.

It is also possible to consider an aspect of performing temperature compensation by combining a temperature sensor and a sensor that detects an elastic wave. In this aspect, the temperature sensor is disposed in the sensor that detects an elastic wave or around this sensor. Based on temperature data obtained from the temperature sensor, the sensitivity of the sensor that detects an elastic wave is corrected. Meanwhile, according to the present embodiment, temperature compensation can be performed without using the temperature sensor.

Furthermore, according to the present embodiment, when the plurality of sensors (sensors 11a and 11b) are disposed in the rotating machine 1, even if the temperatures at the places where the sensors are disposed differ from each other, the first threshold Th1 of the same value can be used for all of the plurality of sensors. For this reason, it is possible to save the trouble of considering a difference in the temperatures at the places where the sensors are disposed and setting the first threshold Th1 accordingly.

Figure 9:
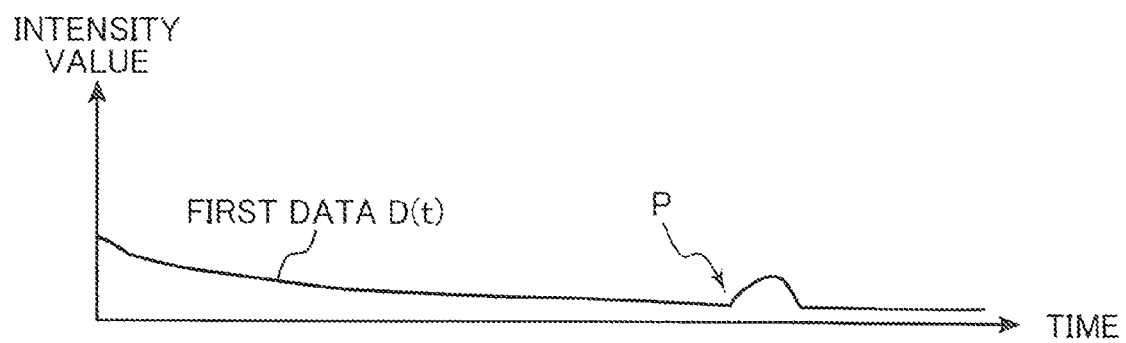
FIG. 9 is a graph illustrating an example in which an intensity value rises gradually when an abnormality occurs in the rotating machine.

A modification of the present embodiment will be described. It has been described with reference to FIG. 4 that if an abnormality occurs in the rotating machine 1, the intensity value will rise sharply. However, the intensity value rises gradually in some cases due to the occurrence of an abnormality in the rotating machine 1. This will be described with reference to FIG. 9. FIG. 9 is a graph illustrating an example in which the intensity value rises gradually when an abnormality occurs in the rotating machine 1. A vertical axis of the graph represents the intensity value, and a horizontal axis of the graph represents time. In the modification, in addition to the average change rate (steps S9 and S10 in FIG. 5), an inclination ratio (value obtained by dividing the average change rate by a reference inclination) is taken into consideration. With this consideration, even when the intensity value does not rise sharply but rises gradually, it is possible to quickly detect occurrence of an abnormality in the rotating machine 1. The modification will be described in detail below.

Figure 10:
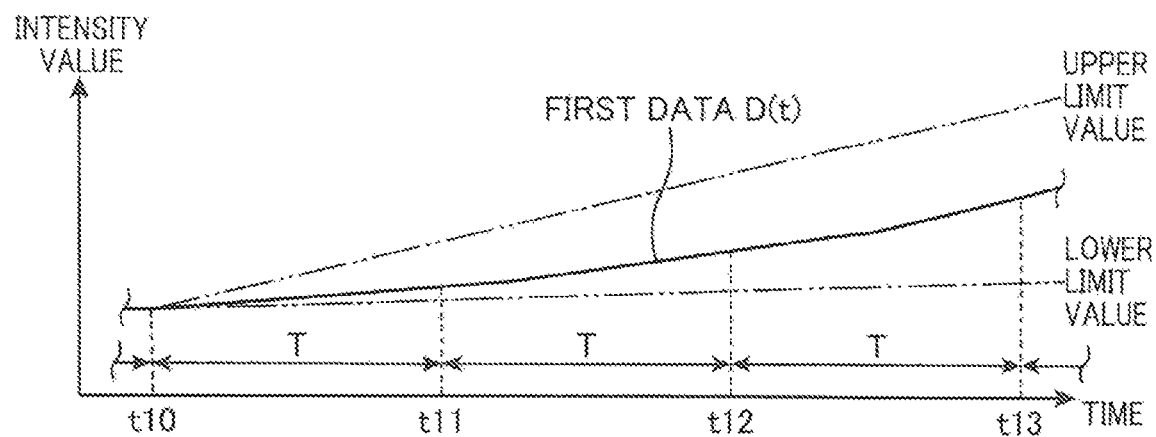
FIG. 10 is an enlarged view of a portion indicated by an arrow P of FIG. 9.

An arrow P in FIG. 9 indicates a portion of the first data D(t) where the intensity value starts to rise due to occurrence of an abnormality in the rotating machine 1. FIG. 10 is an enlarged view of a portion indicated by the arrow P. In the modification, in addition to the determination whether the average change rate is within the range between the lower limit value and the upper limit value (step S10 in FIG. 5), a determination is made as to whether the inclination ratio is equal to or less than a predetermined second threshold Th2.

The inclination ratio is a value obtained by dividing the average change rate by the reference inclination. For example, the inclination ratio in the predetermined period T (the period from a time t11 to a time t12) is a value obtained by dividing the average change rate of the first data D(t) in this predetermined period T by the average change rate of the first data D(t) in the previous predetermined period T (the period from the time t10 to the time t11). The average change rate in the previous predetermined period T is the reference inclination.

When the inclination ratio exceeds the second threshold Th2, the second determination unit 17 determines that the first data D(t) has started to rise gradually, and the update unit 18 does not update the reference intensity value and the reference inclination. The second threshold Th2 is a value with which it can be determined that the first data D(t) has started to rise gradually. For example, the second threshold Th2 is 1.

In the present embodiment, in the predetermined period T (e.g., the period from the time t11 to the time t12), when the average change rate of the first data D(t) is within the range between the lower limit value and the upper limit value (Yes in step S10 of FIG. 5), the reference intensity value is updated from the intensity value D(t11) to the intensity value D(t12), and in the next predetermined period T (the period from the time t12 to the time t13), the intensity ratio is calculated by using the intensity value D(t12) as the reference intensity value.

Meanwhile, in the modification, in the predetermined period T (e.g., the period from the time t11 to the time t12), even when the average change rate of the first data D(t) is within the range between the lower limit value and the upper limit value, if the inclination ratio in this predetermined period T (the period from the time t11 to the time t12) exceeds the second threshold Th2 (this means that the first data D(t) starts to rise gradually), the reference intensity value is not updated, and the intensity value D(t11) is continuously used as the reference intensity value in the next predetermined period (the period from the time t12 to the time t13).

As an example of the gradual rise of the first data D(t), it is assumed that the intensity value D(t11) is 1.0 at the time t11, the intensity value D(t12) is 1.1 at the time t12, and the intensity value D(t13) is 1.3 at the time t13. It is assumed that the first threshold Th1 is 1.2. In the predetermined period T from the time t12 to the time t13, when the reference intensity value is 1.1 (when the reference intensity value is updated), since the intensity ratio in this predetermined period T does not exceed the first threshold Th1, the first determination unit 16 fails to determine that the rotating machine 1 is abnormal. Meanwhile, in the predetermined period T from the time t12 to the time t13, when the reference intensity value is 1.0 (when the reference intensity value is not updated), since the intensity ratio in this predetermined period T exceeds the first threshold Th1, the first determination unit 16 can determine that the rotating machine 1 is abnormal.

In this manner, according to the modification, since the reference intensity value is not updated, it can be quickly determined that the intensity ratio becomes larger than the first threshold Th1 in step S4 of FIG. 5. Therefore, even when an abnormality occurs in the rotating machine 1 and the intensity value rises gradually, the abnormality can be detected quickly.

Figure 11:
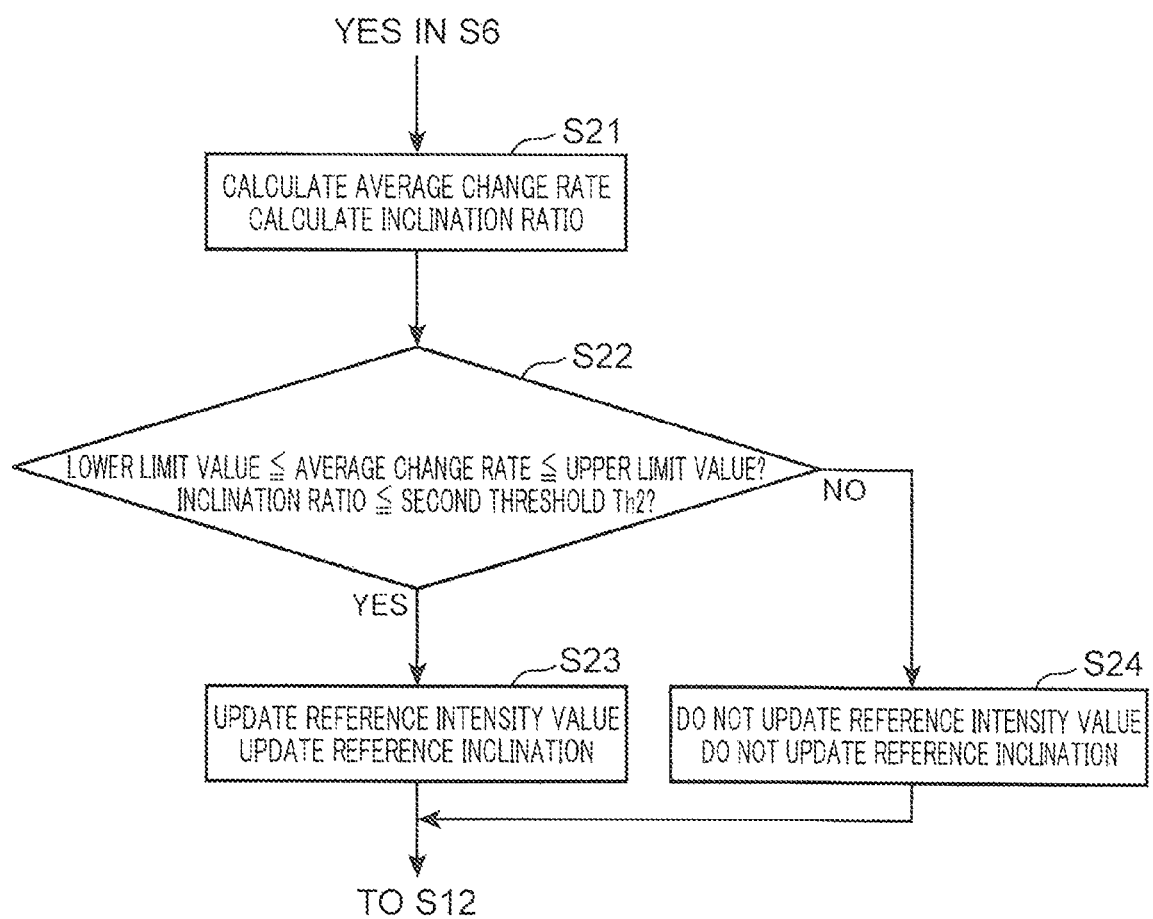
FIG. 11 is part of a flowchart describing an operation of a modification of the present embodiment.

FIG. 11 is part of a flowchart describing an operation of the modification of the present embodiment. The modification differs from the present embodiment in a process between Yes in step S6 and step S12 of the flowchart illustrated in FIG. 5.

With reference to FIGS. 2 and 11, when the first determination unit 16 determines that the predetermined period has elapsed (Yes in step S6), the second determination unit 17 calculates the average change rate and the inclination ratio (step S21). The average change rate is calculated by the same method as in step S9 of FIG. 5.

The inclination ratio is calculated by dividing the average change rate in the predetermined period by the predetermined reference inclination. An initial value of the reference inclination is the average change rate of the first data D(t) in a first predetermined period from the operation start of the rotating machine 1 (operation start of the rotating machine abnormality detection device 10).

The second determination unit 17 determines whether the average change rate calculated in step S21 is within the range between the lower limit value and the upper limit value (within the predetermined range) (step S22). This is the same process as in step S10 of FIG. 5. The second determination unit 17 determines whether the inclination ratio calculated in step S21 is equal to or less than the second threshold Th2 (step S22).

When the second determination unit 17 determines that the average change rate is within the range between the lower limit value and the upper limit value, and determines that the inclination ratio is equal to or less than the second threshold Th2 (Yes in step S22), the update unit 18 updates the reference intensity value to make the last intensity value in the predetermined period the reference intensity value (step S23). This process is the same as in step S11 of FIG. 5. Furthermore, the update unit 18 updates the reference inclination to make the average change rate in this predetermined period the reference inclination (step S23).

When the second determination unit 17 determines that the average change rate is out of the range between the lower limit value and the upper limit value, or determines that the inclination ratio exceeds the second threshold Th2 (No in step S22), the update unit 18 does not update the reference intensity value and the reference inclination (step S24). The reference intensity value and the reference inclination used this time will be used continuously in the next predetermined period T.

The rotating machine abnormality detection device 10 according to the present embodiment and the modification thereof are intended for the rotating machine 1 including two rotating bodies (first rotating body 2 and second rotating body 3), but can also be intended for the rotating machine 1 including one rotating body.

Examples of the rotating machine 1 in which an abnormality is to be detected by the rotating machine abnormality detection device 10 according to the present embodiment and the modification thereof include, but are not limited to, a compressor.

CONCLUSION OF EMBODIMENT

A rotating machine abnormality detection device according to a first aspect of the present embodiment is a device for detecting an abnormality of a rotating machine including a rotating body by using a sensor that detects an elastic wave generated from the rotating machine. The rotating machine abnormality detection device includes: an acquisition unit configured to acquire data generated by using a signal output from the sensor, the data being obtained by arranging an intensity value indicating intensity of the elastic wave on a time-series basis; a first determination unit configured to determine that the rotating machine is abnormal when an intensity ratio exceeds a first threshold as a result of a first process, the first process being defined as a process of sequentially dividing the intensity value contained in the data by a predetermined reference intensity value to calculate the intensity ratio, and sequentially comparing the intensity ratio with the predetermined first threshold to determine whether the intensity ratio exceeds the first threshold; a second determination unit configured to perform a second process every time a predetermined period elapses, the second process being defined as a process of, when the predetermined period has elapsed, calculating an average change rate of the data in the predetermined period to determine whether the average change rate is within a predetermined range; and an update unit configured to update and lower the reference intensity value when it is determined as a result of the second process that the average change rate is within the range. When the reference intensity value is updated, the first determination unit performs the first process by using the updated reference intensity value in the next predetermined period.

The first determination unit does not sequentially compare the intensity value with the first threshold, but performs the first process, that is, the process of sequentially dividing the intensity value contained in the data by the reference intensity value to calculate the intensity ratio, sequentially comparing the intensity ratio with the first threshold, and determining whether the intensity ratio exceeds the first threshold. The intensity value is preferably a root mean square (RMS) value of the signal output from the sensor. When the intensity ratio exceeds the first threshold as a result of the first process, the first determination unit determines that the rotating machine is abnormal.

Meanwhile, when the predetermined period has elapsed, the second determination unit performs the second process, that is, the process of calculating the average change rate of the data in the predetermined period and determining whether the average change rate is within the predetermined range. The predetermined range is a range in which no abnormality has occurred in the rotating machine, but since the temperature at the place where the sensor is disposed rises, the sensitivity of the sensor gradually decreases, resulting in a gradual decrease in the intensity of the elastic wave. The average change rate being within the predetermined range means that the rotating machine is in a normal condition. When it is determined that the average change rate is within the predetermined range, the update unit updates and lowers the reference intensity value. When the reference intensity value is updated, the first determination unit performs the first process using the updated reference intensity value in the next predetermined period.

In this manner, when there is no abnormality in the rotating machine but the intensity value decreases gradually because the temperature rises gradually at the place where the sensor is disposed, the rotating machine abnormality detection device according to the first aspect of the present embodiment updates and lowers the reference intensity value, and calculates the intensity ratio by using this updated reference intensity value. That is, instead of using data as it is for comparison with the first threshold, the rotating machine abnormality detection device according to the first aspect of the present embodiment normalizes the data and compares the normalized data with the first threshold. Therefore, even if the intensity value decreases gradually because the temperature at the place where the sensor is disposed rises gradually, it is possible to detect a rise in the intensity value caused by occurrence of an abnormality in the rotating machine.

Note that an aspect of performing temperature compensation by combining the temperature sensor and a sensor that detects the elastic wave can also be considered. In this aspect, the temperature sensor is disposed in the sensor that detects the elastic wave or around this sensor. Based on temperature data obtained from the temperature sensor, the sensitivity of the sensor that detects the elastic wave is corrected. Meanwhile, the rotating machine abnormality detection device according to the first aspect of the present embodiment can perform temperature compensation without using the temperature sensor.

In the configuration described above, when it is determined that the average change rate is out of the range, the update unit does not update the reference intensity value.

When it is determined that the average change rate is out of the predetermined range (that is, when it is determined that the average change rate is not within the predetermined range), if the reference intensity value is lowered, the first determination unit may not be able to correctly determine whether an abnormality has occurred in the rotating machine. Therefore, when it is determined that the average change rate is out of the predetermined range, the update unit does not update the reference intensity value.

In the configuration described above, the second determination unit calculates the average change rate by using the following formula, and in updating the reference intensity value, the update unit makes the last intensity value in the predetermined period the reference intensity value.

$$\text{Average change rate} = |VF - VL|/T,$$

(where T represents the predetermined period, VF represents the first intensity value in the predetermined period, and VL represents the last intensity value in the predetermined period). This configuration is one example of the reference intensity value to be updated.

In the configuration described above, the second determination unit performs a third process in addition to the second process every time the predetermined period elapses, the third process is defined as a process of, when the predetermined period has elapsed, dividing the average change rate in the predetermined period by a predetermined reference inclination to calculate an inclination ratio, and determining whether the inclination ratio exceeds a predetermined second threshold, when it is determined as a result of the second process that the average change rate is within the range and when it is determined as a result of the third process that the inclination ratio is equal to or less than the second threshold, the update unit updates the reference intensity value to make the last intensity value in the predetermined period the reference intensity value, and the update unit updates the reference inclination to make the average change rate in the predetermined period the reference inclination, and when the reference inclination is updated, the second determination unit performs the third process by using the updated reference inclination in the next predetermined period.

With this configuration, in addition to the average change rate, the inclination ratio (a value obtained by dividing the average change rate by the reference inclination) is taken into consideration. Accordingly, even when the intensity value does not rise sharply but rises gradually, it is possible to quickly detect that an abnormality has occurred in the rotating machine.

A rotating machine abnormality detection method according to a second aspect of the present embodiment is a method for detecting an abnormality of a rotating machine including a rotating body by using a sensor that detects an elastic wave generated from the rotating machine. The rotating machine abnormality detection method includes: a first step of acquiring data generated by using a signal output from the sensor, the data being obtained by arranging an intensity value indicating intensity of the elastic wave on a time-series basis; a second step of determining that the rotating machine is abnormal when an intensity ratio exceeds a first threshold as a result of a first process, the first process being defined as a process of sequentially dividing the intensity value contained in the data by a predetermined reference intensity value to calculate the intensity ratio, and sequentially comparing the intensity ratio with the predetermined first threshold to determine whether the intensity ratio exceeds the first threshold; a third step of performing a second process every time a predetermined period elapses, the second process being defined as a process of, when the predetermined period has elapsed, calculating an average change rate of the data in the predetermined period to determine whether the average change rate is within a predetermined range; and a fourth step of updating and lowering the reference intensity value when it is determined as a result of the second process that the average change rate is within the range. The second step includes, when the reference intensity value is updated, performing the first process by using the updated reference intensity value in the next predetermined period.

The rotating machine abnormality detection method according to the second aspect of the present embodiment has the same operational effect as the rotating machine abnormality detection device according to the first aspect of the present embodiment has.

A rotating machine according to a third aspect of the present embodiment is a rotating machine including the abnormality detection device.

The rotating machine according to the third aspect of the present embodiment has the same operational effect as the rotating machine abnormality detection device according to the first aspect of the present embodiment has.

This application is based on Japanese Patent Application No. 2015-211558 filed on Oct. 28, 2015, details of which are included in the present application.

To describe the present invention, the present invention has been adequately and fully described above through the embodiment with reference to the drawings, but it should be appreciated that those skilled in the art can easily change and/or improve the embodiment described above. Therefore, unless modifications or refinements implemented by those skilled in the art are at the level of departing from the scope of the claims set forth in the appended claims, such modifications or refinements are interpreted as being included in the scope of the claims.

INDUSTRIAL APPLICABILITY

According to the present invention, it is possible to provide a rotating machine abnormality detection device, a rotating machine abnormality detection method, and a rotating machine.

The invention claimed is:

1. A rotating machine abnormality detection device for detecting an abnormality of a rotating machine including a rotating body by using a sensor that detects an elastic wave generated from the rotating machine, the rotating machine abnormality detection device comprising:
an acquisition unit configured to acquire data generated by using a signal output from the sensor, the data being obtained by arranging an intensity value indicating intensity of the elastic wave on a time-series basis;
a first determination unit configured to determine that the rotating machine is abnormal when an intensity ratio exceeds a first threshold as a result of a first process, the first process being defined as a process of sequentially dividing the intensity value contained in the data by a predetermined reference intensity value to calculate the intensity ratio, and sequentially comparing the intensity ratio with the predetermined first threshold to determine whether the intensity ratio exceeds the first threshold;
a second determination unit configured to perform a second process every time a predetermined period elapses, the second process being defined as a process of, when the predetermined period has elapsed, calculating an average change rate of the data in the predetermined period to determine whether the average change rate is within a predetermined range; and
an update unit configured to update and lower the reference intensity value when it is determined as a result of the second process that the average change rate is within the range,
wherein when the reference intensity value is updated, the first determination unit performs the first process by using the updated reference intensity value in the next predetermined period.

2. The rotating machine abnormality detection device according to claim 1, wherein when it is determined that the average change rate is out of the range, the update unit does not update the reference intensity value.

3. The rotating machine abnormality detection device according to claim 1, wherein
the second determination unit calculates the average change rate by using a formula below, and
in updating the reference intensity value, the update unit makes the last intensity value in the predetermined period the reference intensity value:

$$\text{average change rate} = |VF - VL|/T$$

(where T represents the predetermined period, VF represents the first intensity value in the predetermined period, and VL represents the last intensity value in the predetermined period).

4. The rotating machine abnormality detection device according to claim 3, wherein
the second determination unit performs a third process in addition to the second process every time the predetermined period elapses, the third process is defined as a process of, when the predetermined period has elapsed, dividing the average change rate in the predetermined period by a predetermined reference inclination to calculate an inclination ratio, and determining whether the inclination ratio exceeds a predetermined second threshold,
when it is determined as a result of the second process that the average change rate is within the range and when it is determined as a result of the third process that the inclination ratio is equal to or less than the second threshold, the update unit updates the reference intensity value to make the last intensity value in the predetermined period the reference intensity value, and the update unit updates the reference inclination to make the average change rate in the predetermined period the reference inclination, and
when the reference inclination is updated, the second determination unit performs the third process by using the updated reference inclination in the next predetermined period.

5. The rotating machine abnormality detection device according to claim 1, wherein the acquisition unit makes a root mean square value of the signal output from the sensor the intensity value.

6. A rotating machine abnormality detection method for detecting an abnormality of a rotating machine including a rotating body by using a sensor that detects an elastic wave generated from the rotating machine, the rotating machine abnormality detection method comprising:
a first step of acquiring data generated by using a signal output from the sensor, the data being obtained by arranging an intensity value indicating intensity of the elastic wave on a time-series basis;
a second step of determining that the rotating machine is abnormal when an intensity ratio exceeds a first threshold as a result of a first process, the first process being defined as a process of sequentially dividing the intensity value contained in the data by a predetermined reference intensity value to calculate the intensity ratio, and sequentially comparing the intensity ratio with the predetermined first threshold to determine whether the intensity ratio exceeds the first threshold;

a third step of performing a second process every time a predetermined period elapses, the second process being defined as a process of, when the predetermined period has elapsed, calculating an average change rate of the data in the predetermined period to determine whether the average change rate is within a predetermined range; and a fourth step of updating and lowering the reference intensity value when it is determined as a result of the second process that the average change rate is within the range, wherein the second step includes, when the reference intensity value is updated, performing the first process by using the updated reference intensity value in the next predetermined period.

7. A rotating machine comprising the abnormality detection device according to claim 1.

* * * * *